US012033777B2

(12) United States Patent
Liu et al.

(10) Patent No.: US 12,033,777 B2
(45) Date of Patent: Jul. 9, 2024

(54) AMORPHOUS NANOCRYSTALLINE SOFT MAGNETIC MATERIAL, PREPARATION METHOD THEREFOR AND USE THEREOF, AMORPHOUS RIBBON MATERIAL, AMORPHOUS NANOCRYSTALLINE RIBBON MATERIAL, AND AMORPHOUS NANOCRYSTALLINE MAGNETIC SHEET

(71) Applicant: HENGDIAN GROUP DMEGC MAGNETICS CO., LTD, Jinhua (CN)

(72) Inventors: Yangyang Liu, Jinhua (CN); Yaqi Fu, Jinhua (CN)

(73) Assignee: HENGDIAN GROUP DMEGC MAGNETICS CO., LTD, Jinhua (CN)

(*) Notice: Subject to any disclaimer, the term of this patent is extended or adjusted under 35 U.S.C. 154(b) by 116 days.

(21) Appl. No.: 17/624,979

(22) PCT Filed: Jun. 9, 2020

(86) PCT No.: PCT/CN2020/095009
§ 371 (c)(1),
(2) Date: Jan. 5, 2022

(87) PCT Pub. No.: WO2021/012820
PCT Pub. Date: Jan. 28, 2021

(65) Prior Publication Data

US 2022/0293314 A1 Sep. 15, 2022

(30) Foreign Application Priority Data

Jul. 19, 2019 (CN) ......................... 201910656298.4

(51) Int. Cl.
*H01F 1/153* (2006.01)
*C21D 6/00* (2006.01)
(Continued)

(52) U.S. Cl.
CPC ......... *H01F 1/15333* (2013.01); *C21D 6/008* (2013.01); *C21D 8/0205* (2013.01);
(Continued)

(58) Field of Classification Search
None
See application file for complete search history.

(56) References Cited

U.S. PATENT DOCUMENTS 6,053,989 A 4/2000 Orillion et al.
2018/0218811 A1 8/2018 Harada et al.

FOREIGN PATENT DOCUMENTS

CN 104376950 A 2/2015
CN 106119739 A 11/2016
(Continued)

OTHER PUBLICATIONS

English language machine translation of RU 2269174. Generated Oct. 3, 2023. (Year: 2023).*
Extended European Search Report for European Patent Application No. 20844878.7, dated Jul. 7, 2023.
(Continued)

*Primary Examiner* — Brian D Walck
(74) *Attorney, Agent, or Firm* — Andrus Intellectual Property Law, LLP

(57) ABSTRACT

Disclosed are an amorphous nanocrystalline soft magnetic material, a preparation method therefor and an application thereof, an amorphous ribbon material, an amorphous nanocrystalline ribbon material, and an amorphous nanocrystalline magnetic sheet. The soft magnetic material comprises an amorphous matrix phase, a nanocrystalline phase distributed in the amorphous matrix phase, and fine crystalline particles distributed in the amorphous matrix phase and the nanocrystalline phase. The amorphous matrix phase comprises Fe, Si, and B, the fine crystalline particles comprise metal carbides, and the soft magnetic material comprises Fe, Si, B, P, and Cu.

16 Claims, 2 Drawing Sheets

(51) Int. Cl.

| | |
|---|---|
| ***C21D 8/02*** | (2006.01) |
| ***C21D 9/52*** | (2006.01) |
| ***C22C 33/00*** | (2006.01) |
| ***C22C 45/02*** | (2006.01) |

(52) U.S. Cl.

CPC ............. *C21D 8/0236* (2013.01); *C21D 9/52* (2013.01); *C22C 33/003* (2013.01); *C22C 45/02* (2013.01); *H01F 1/15341* (2013.01); *C22C 2200/02* (2013.01); *C22C 2202/02* (2013.01)

(56) References Cited

FOREIGN PATENT DOCUMENTS

| | | | |
|---|---|---|---|
| CN | 108251765 | A | 7/2018 |
| CN | 109440023 | A | 3/2019 |
| CN | 109716463 | A | 5/2019 |
| CN | 110257735 | A | 9/2019 |
| CN | 110257736 | A | 9/2019 |
| EP | 3511957 | | 7/2019 |
| RU | 2269174 | C2 | 1/2006 |

OTHER PUBLICATIONS

Initial Search for Chinese Patent Application No. 201910555298.4.
Office Action for Chinese Patent Application No. 201910656298.4, mailed Feb. 21, 2020.
International Search Report for PCT Application No. PCT/CN2020/095009, mailed Aug. 20, 2020.

* cited by examiner

AMORPHOUS NANOCRYSTALLINE SOFT MAGNETIC MATERIAL, PREPARATION METHOD THEREFOR AND USE THEREOF, AMORPHOUS RIBBON MATERIAL, AMORPHOUS NANOCRYSTALLINE RIBBON MATERIAL, AND AMORPHOUS NANOCRYSTALLINE MAGNETIC SHEET

CROSS-REFERENCE TO RELATED APPLICATION(S)

This is a national stage application filed under 37 U.S.C. 371 based on International Patent Application No. PCT/CN2020/095009, filed Jun. 9, 2020, which claims priority to Chinese Patent Application No. 201910656298.4, filed on Jul. 19, 2019, the disclosures of which are incorporated herein by reference in their entireties.

TECHNICAL FIELD

The present application belongs to the field of a magnetic material, and relates to a soft magnetic material, a preparation method therefor and use thereof, an amorphous ribbon material, a soft magnetic ribbon material and a soft magnetic sheet, for example, an amorphous nanocrystalline soft magnetic material, a preparation method therefor and use thereof, an amorphous ribbon material, an amorphous nanocrystalline ribbon material, and an amorphous nanocrystalline magnetic sheet.

BACKGROUND

An soft magnetic material is a kind of commonly used functional material that is easy to be magnetized and demagnetized, and the soft magnetic material has excellent magnetic application characteristics such as high magnetic permeability, low coercivity, low hysteresis, low loss and the like, being widely used in the power, electronics, motor and other industries. Since the 19th century, soft magnetic materials have successively developed a series of material systems such as electrical pure iron, silicon steel, permalloy, iron aluminum alloy, iron silicon aluminum alloy, iron cobalt alloy, soft magnetic ferrite, amorphous and nanocrystalline soft magnetic alloys and the like. Among them, the research of nanocrystalline soft magnetic alloys began in 1988 with the Fe—Si—B—Nb—Cu alloy system discovered by Yoshizawa et al., Hitachi Metals, Japan. The alloy system was found to have excellent performances such as high permeability, low loss, high resistance, and high saturation magnetic flux density, as well as simple manufacturing process and low cost, so as to have attracted wide attention of researchers.

An iron-based nanocrystalline soft magnetic alloy in the prior art is the Fe—Si—B—P—Cu alloy system. In this alloy system, although the addition of P can reduce the grain size of the alloy system to a certain extent, its effect is very small due to the limitation of P itself and the fine grain mechanism, leading to the problems of high coercive force, low magnetic permeability, high loss and the like. Moreover, there are high requirements during production process on the alloy crystallization annealing process, which is mainly reflected in the required very high heating rate (300-400° C./min), thereby increasing the difficulty of the process. Fe—Si—B—P—Cu alloys obtained by the currently and widely used annealing process generally have large grain sizes and high coercivity.

It can be seen that, currently, for iron-based nanocrystalline soft magnetic alloys in the Fe—Si—B—P—Cu alloy system, it is a major problem that researchers commit to solving how to reduce the coercive force while reducing the process difficulty.

CN105261435A discloses an iron-based amorphous nanocrystalline soft magnetic alloy ribbon and a preparation method thereof. The scheme provides an iron-based amorphous nanocrystalline soft magnetic alloy ribbon, having the composition shown in $Fe_aSi_bB_cP_dCu_eMe_f$, wherein a, b, c, d, e and f respectively represent the content of Fe, Si, B, P, Cu and Me in atomic mass parts in the alloy ribbon; 80≤a≤90; 0.5≤b≤5; 5≤c≤12; 1≤d≤9; 0.3≤e≤2; 0.3≤f≤3; a+b+c+d+e+f=100. This solution has the problems of large grain size and high coercivity.

SUMMARY

The summary of the subject matter described in detail herein is given below. This summary is not intended to limit the protection scope of the claims.

An object of the present application is to provide an amorphous nanocrystalline soft magnetic material and a preparation method therefor and use thereof, an amorphous ribbon, an amorphous nanocrystalline ribbon and an amorphous nanocrystalline magnetic sheet. The amorphous nanocrystalline soft magnetic material provided in the present application can solve the technical problems of high coercivity and high process difficulty of the iron-based nanocrystalline soft magnetic alloy in the existing Fe—Si—B—P—Cu alloy system.

To achieve this object, the present application adopts the following technical solutions.

In a first aspect, the present application provides an amorphous nanocrystalline soft magnetic material. The amorphous nanocrystalline soft magnetic material includes an amorphous matrix phase, a nanocrystalline phase distributed in the amorphous matrix phase, and a fine crystalline particle distributed in the amorphous matrix phase and nanocrystalline phase. The amorphous matrix phase includes Fe, Si and B; the fine crystalline particle includes metal carbides; and the amorphous nanocrystalline soft magnetic material contains Fe, Si, B, P and Cu.

The amorphous nanocrystalline soft magnetic material provided in the present application belongs to a Fe—Si—B—P—Cu alloy system.

The amorphous nanocrystalline soft magnetic material provided in the present application belongs to an iron-based soft magnetic alloy, wherein the fine crystalline particle is dispersed in the amorphous matrix phase and nanocrystalline phase.

The amorphous nanocrystalline soft magnetic material provided in the present application belongs to the Fe—Si—B—P—Cu alloy system. Among the amorphous nanocrystalline soft magnetic material provided in the present application, the process of preparing the amorphous nanocrystalline soft magnetic material generally comprises: forming an amorphous alloy first, then crystallizing the amorphous alloy to obtain an amorphous nanocrystalline soft magnetic material. In the formation process of amorphous alloy, various components are solid-dissolved in the amorphous matrix phase due to the very fast cooling rate. In the process of crystallizing amorphous alloy to form amorphous nanocrystalline soft magnetic material, the fine crystalline particle including metal carbides gradually solid-solution precipitates out of the amorphous matrix phase due to the decrease in solid solubility while the temperature rises, and is dispersed in the matrix phase. During the growth of the subsequently formed nanocrystalline phase, after a grain boundary encounters the metal carbide, the metal carbide has a pinning effect on the grain boundary, which can inhibit the migration of the grain boundary, thereby inhibiting the growth of the nanocrystalline phase. The crystal grain size of the finally obtained nanocrystalline phase can be maintained at a relatively small nanometer level. At the same time, because the fine crystalline particle including metal carbides is solid-solution precipitated from the amorphous matrix phase and dispersed in the amorphous matrix phase, the fine crystalline particle generally has an extremely small particle size, often in a nano-sized scale, and has a very small hindering effect on the magnetic domain deflection and domain wall movement in the amorphous nanocrystalline soft magnetic material. Thereby, the finally formed amorphous nanocrystalline soft magnetic material can have a lower coercivity. In addition, in the amorphous nanocrystalline soft magnetic material provided in the present application, the fine crystal mechanism of metal carbides is solid solution precipitation to pin the grain boundaries to fine the grain. As compared to that a high heating rate (300° C./min-400° C./min) is required when P is used to fine the grains in the existing Fe—Si—B—P—Cu alloy system, so that P atoms can effectively act on the grain boundaries to hinder the growth of the grain boundaries and achieve the effect of fine grain, a high heating rate is not required during crystallization in the production process of the amorphous nanocrystalline soft magnetic material provided in the present application, and there are low crystallization requirements and a reduced process difficulty.

Additionally, in the amorphous nanocrystalline soft magnetic material provided in the present application, the amorphous forming ability of the amorphous nanocrystalline soft magnetic material can be improved due to the addition of Cu and P elements, so that a completely amorphous amorphous-alloy can be obtained during the preparation process of amorphous alloy, thereby ensuring that a relatively uniform nanocrystalline phase is obtained after crystallization of the amorphous alloy, so as to balance the saturation magnetic induction and coercivity of the amorphous nanocrystalline soft magnetic material and to improve the comprehensive magnetic properties of amorphous nanocrystalline soft magnetic material. Moreover, in the process of crystallization of amorphous alloy to form amorphous nanocrystalline soft magnetic material, Cu elements generally and gradually agglomerate in the amorphous matrix phase before the crystallization and precipitation of the nanocrystalline phase, forming a large amount of dispersively distributed agglomeration points. These agglomeration points are used as nucleation points for the crystallization and precipitation of the nanocrystalline phase, increasing the number of nucleation for crystallization and precipitation of the nanocrystalline phase, thereby further reducing the size of the final nanocrystalline phase to balance the saturation magnetic induction and coercivity of amorphous nanocrystalline soft magnetic material and to improve the comprehensive magnetic properties of amorphous nanocrystalline soft magnetic material.

The following are optional technical solutions for the present application, but not as a limitation to the technical solutions provided in the present application. Through the following optional technical solutions, the technical objects and beneficial effects of the present application can be better achieved and realized.

As an optional technical solution of the present application, the molecular formula of the soft magnetic material is $Fe_aSi_bB_cCu_dP_eM_f(XC)_h$, wherein M is selected from any one or a combination of at least two of Ta, W, Mo, Ge, Zr, Hf or Y; X is Nb and/or V; 1≤b≤12, for example, b may be 1, 3, 5, 7, 9, 11 or 12, etc.; 3≤c≤10, for example, c may be 3, 4, 5, 6, 7, 8, 9 or 10, etc.; 0.5≤d≤3, for example, d may be 0.5, 1, 1.5, 2, 2.5 or 3, etc.; 1≤e≤7, for example, e may be 1, 2, 3, 4, 5, 6 or 7, etc.; 0≤f≤8, for example, f may be 0, 1, 2, 3, 4, 5, 6, 7 or 8, etc.; 0.1≤h≤2, for example, h may be 0.1, 0.5, 0.8, 1, 1.5 or 2, etc.; and a+b+c+d+e+f+h=100.

a, b, c, d, e, f and h herein respectively represent an atomic percentage of each corresponding component, wherein for XC, XC is regarded as a whole "atom". Optionally, the amorphous matrix phase further includes P and Cu. There may be trace amounts of X and C elements in the amorphous matrix phase.

Optionally, the amorphous matrix phase further includes M.

Optionally, the nanocrystalline phase includes α-Fe. Nanocrystallines are substantially composed of α-Fe, and there may be trace amounts of other components of the amorphous nanocrystalline soft magnetic material in the unit cell voids of α-Fe.

Optionally, the metal carbide is XC which may be at least one of NbC and VC, and optionally NbC, wherein X includes but is not limited to Nb and/or V. NbC, VC and the like can pin the grain boundaries of the α-Fe nanocrystalline phase and inhibit the growth of crystal grains.

In the material system provided in the present application, the addition of M element can improve the amorphous forming ability of amorphous nanocrystalline soft magnetic material, so that a completely amorphous amorphous-alloy can be obtained during the preparing process of amorphous alloy, thereby ensuring that a relatively uniform nanocrystalline phase is obtained after the amorphous alloy is crystallized, which further balances the saturation magnetic induction and coercivity of the amorphous nanocrystalline soft magnetic material, and improves the comprehensive magnetic properties of the amorphous nanocrystalline soft magnetic material. As an optional technical solution of the present application, an average particle size of the nanocrystalline phase is less than or equal to 30 nm, e.g., 30 nm, 28 nm, 25 nm, 23 nm, 20 nm, 18 nm, 15 nm, 12 nm or 10 nm, etc., and optionally 10 nm-20 nm.

Optionally, an average particle size of the fine crystaline particle is less than or equal to 10 nm, e.g., 5 nm, 6 nm, 7 nm or 8 nm, etc., and optionally 5 nm-8 nm.

Optionally, in the amorphous nanocrystalline soft magnetic material, an atomic percentage of the nanocrystalline phase is 50 at %-70 at %, e.g., 70 at %, 72 at %, 74 at %, 76 at %, 78 at % or 80 at %, etc, but it is not limited to the listed values, and other unlisted values within this range of values are also applicable.

Optionally, in the amorphous nanocrystalline soft magnetic material, an atomic percentage of fine crystalline particle is 0.1 at %-2 at %, e.g., 0.1 at %, 0.2 at %, 0.5 at %, 0.8 at %, 0.9 at %, 1 at %, 1.5 at % or 2 at %, etc., but it is not limited to the listed values, and other unlisted values within this range of values are also applicable. For XC in fine crystalline particle, XC is regarded as a whole "atom" in the atomic percentage.

In a second aspect, the present application provides a preparation method for the amorphous nanocrystalline soft magnetic material described in the first aspect, wherein the method comprises the following steps:

(1) proportioning a raw material of formulation amount followed by preparing an amorphous alloy; and (2) subjecting the amorphous alloy described in step (1) to a two-stage crystallization under a protective condition, and cooling to obtain the amorphous nanocrystalline soft magnetic material, wherein the crystallization temperature of the second stage is higher than the crystallization temperature of the first stage.

When crystallization is carried out in the first stage in step (2), Fe will not undergo phase change since the holding temperature is lower (lower than the onset temperature of the first crystallization peak of the amorphous alloy). That is to say, the α-Fe nanocrystalline phase will not be crystallized and precipitated. The solid solubility of the fine crystal particles (NbC phase, VC phase and the like) in the amorphous matrix is reduced due to the holding temperature of the fine crystalline particles (NbC phase, VC phase and the like), and the fine crystalline particles (NbC phase, VC phase and the like) gradually solid-dissolves and precipitates from the amorphous matrix. Due to low holding temperature, the aging of fine crystalline particles (NbC phase, VC phase and the like) is not obvious. The size of the fine crystalline particles (NbC phase, VC phase and the like) can be maintained in a few nanometers, and they are dispersed in the amorphous matrix.

When crystallization is performed in the second stage of step (2), the α-Fe nanocrystalline phase begins to precipitate and grow. However, the pinning effect of the dispersed fine crystal particles (NbC phase, VC phase and the like) on the grain boundary hinders the migration of the grain boundary and inhibits the growth of α-Fe nanocrystalline phase. The final α-Fe crystal grain size can be maintained at a relatively small nanometer level. At the same time, since the fine crystalline particles (NbC phase, VC phase and the like) in the amorphous nanocrystalline soft magnetic material are small in size, the fine crystalline particles have very little hindrance to the magnetic domain deflection and domain wall movement in the amorphous nanocrystalline soft magnetic material. Therefore, the amorphous nanocrystalline soft magnetic material can still have high saturation magnetic induction strength and lower coercivity. That is to say, the amorphous nanocrystalline soft magnetic materials can still have excellent soft magnetic properties.

In the preparation method provided in the present application, metal carbides are used to produce fine crystalline. Since the production mechanism of fine crystalline is solid solution precipitation, which can pin the grain boundaries, there is no need to require faster heating rate during crystallization in the production process. The crystallization requirements are low, and the process difficulty is reduced. At the same time, because the crystal grain size of the finally obtained nanocrystalline phase can be maintained at a relatively small nanometer level, and the fine crystalline with a size less than or equal to 10 nm has a very little hindrance to the magnetic domain deflection and domain wall movement in amorphous nanocrystalline soft magnetic material, the saturation magnetic induction and coercive force thereof can be balanced on the basis of the Fe—Si—B—P—Cu alloy system, so as to improve the comprehensive magnetic properties of the amorphous nanocrystalline soft magnetic material.

The preparation method provided in the present application overcomes the defect that fine crystallines are produced by using P in the existing Fe—Si—B—P—Cu alloy system, which leads to the fact that P needs a relatively fast heating rate to massively gather at the grain boundaries for crystallization to achieve fine crystallines. It solves the technical problems of higher coercivity and higher process difficulty of the iron-based nanocrystalline soft magnetic alloy in the existing Fe—Si—B—P—Cu alloy system.

In the present application, when a carbon source, a Nb source, a V source and the like are used in the raw material, the solid solution precipitation temperature of forming NbC, VC, etc., is relatively low (less than 500° C.), while the onset crystallization temperature of α-Fe is usually above 500° C. Thereby, during the crystallization process, the solid solution precipitation of NbC, VC, etc., precedes the crystallization of α-Fe. When α-Fe starts to crystallize, NbC, VC, etc., can realize pinning the grain boundaries of the α-Fe nanocrystalline phase to inhibit the growth of crystal grains.

In the present application, when a copper source is used in the raw material, in the process of crystallization of the amorphous alloy to form the amorphous nanocrystalline soft magnetic material, Cu generally and gradually agglomerates in the amorphous matrix phase before the crystallization and precipitation of the α-Fe nanocrystalline phase to form a large number of dispersed agglomeration points. These agglomeration points serve as nucleation points for the crystallization and precipitation of the α-Fe nanocrystalline phase, to increase the number of nucleation for crystallization and precipitation of the α-Fe nanocrystalline phase, thereby further reducing the size of the final α-Fe nanocrystalline phase to balance the saturation magnetic induction and coercivity of the amorphous nanocrystalline soft magnetic material. As an optional technical solution in the present application, the method of preparing an amorphous alloy in step (1) comprising:

(11) melting the proportioned raw material under a protective condition to obtain an alloy liquid or an alloy ingot;

(12) cooling the alloy liquid in step (11) to obtain the amorphous alloy; or remelting the alloy ingot in step (11) and cooling to obtain the amorphous alloy. In the present application, the method of preparing the alloy ingot first and then cooling the alloy ingot can make the distribution of the raw material more uniform, which is better than the method of directly cooling the alloy liquid.

In the preparation method provided in the present application, the cooling in step (12) is rapid cooling, i.e., cooling with a very fast cooling rate. This rapid cooling causes the various components to be solid-dissolved in the amorphous matrix phase due to the very fast cooling rate during the formation of the amorphous alloy. The amorphous alloy prepared in step (12) may be in the shape of a ribbon, rod, ring or wire.

In the raw materials described in step (11), the raw material of iron is a simple substance of iron, the raw material of copper is a simple substance of copper, and the raw material of silicon is a simple substance of silicon. The raw materials of other elements may be iron alloys thereof or simple substances thereof, which can be selected according to the prior art. Optionally, a purity of the raw material in step (11) is greater than 99 wt. %., e.g. 99.1 wt. %, 99.2 wt. %, 99.3 wt. %, 99.4 wt. %, 99.5 wt. % or 99.6 wt. %, etc.

Optionally, the protective condition in step (11) include vacuum or protective gas.

Optionally, the protective gas includes nitrogen or argon.

Optionally, a melting temperature in step (11) is 1300° C.-1500° C., e.g. 1300° C., 1350° C., 1400° C., 1450° C. or 1500° C., etc., but it is not limited to the listed values, and other unlisted values within this range of values are also applicable.

Optionally, a melting method in step (11) includes any one of arc melting, intermediate frequency induction melting or high frequency induction melting.

Optionally, the cooling rate in step (12) is greater than or equal to $10^{6°}$ C./s, e.g. $1\times10^{6°}$ C./s, $2\times10^{6°}$ C./s, $3\times10^{6°}$ C./s, $4\times10^{6°}$ C./s, $5\times10^{6°}$ C./s or $6\times10^{6°}$ C./s, etc. The cooling at the cooling rate is rapid cooling, which is suitable for making various components solid-dissolve in the amorphous matrix phase in the preparation method provided in the present application. Optionally, a cooling method in step (12) includes a single-roll cold method, a copper mold blow-casting method, a copper mold suction casting method or a Taylor method, and optionally, the single-roll quenching method. When the single-roll quenching method is adopted, the high-temperature alloy is sprayed onto a single-roller at room temperature and cooled rapidly, making various components solid dissolve in the amorphous matrix phase.

Optionally, a protective condition in step (2) includes vacuum or protective gas.

Optionally, the protective gas includes nitrogen and/or argon.

Optionally, a crystallization temperature of the first stage in step (2) is 5° C.-20° C. below the onset temperature of the first crystallization peak of the amorphous alloy in step (1), e.g. 5° C., 6° C., 7° C., 8° C., 9° C., 10° C., 11° C., 12° C., 13° C., 14° C., 15° C., 16° C., 17° C., 18° C., 19° C. or 20° C., etc., but it is not limited to the listed values, and other unlisted values within this range of values are also applicable. In the present application, if the crystallization temperature of the first stage is too high, it will cause the premature precipitation of the nanocrystalline phase, and the XC fine crystalline particles cannot effectively inhibit the growth of the nanocrystalline grains; if the crystallization temperature in the first stage is too low, the XC fine crystalline particles will not be able to precipitate in a large amount, so that there is no effect of inhibiting the growth of nanocrystalline grains.

Optionally, a heating rate to the crystallization temperature of the first stage in step (2) is 5° C./min-10° C./min, e.g. 5° C./min, 6° C./min, 7° C./min, 8° C./min, 9° C./min or 10° C./min, etc., but it is not limited to the listed values, and other unlisted values within this range of values are also applicable.

Optionally, a holding time at the crystallization temperature of the first stage in step (2) is 5 min-30 min, e.g. 5 min, 10 min, 15 min, 20 min, 25 min or 30 min, etc., but it is not limited to the listed values, and other unlisted values within this range of values are also applicable.

Optionally, a crystallization temperature of the second stage in step (2) is 30° C., 40° C., 50° C., 60° C., 70° C., 80° C., 90° C. or 100° C., etc., above the onset temperature of the first crystallization peak of the amorphous alloy in step (1), but it is not limited to the listed values, and other unlisted values within this range of values are also applicable. In the present application, if the crystallization temperature of the second stage is too high, it will cause the precipitation of other second phases that are unfavorable to the magnetic properties, such as $Fe_2B$ and the like, so as to deteriorate the magnetic performance; if the crystallization temperature of the second stage is too low, it will cause incomplete formation of nanocrystalline grains, and small content of nanocrystalline phase, so the best magnetic properties cannot be obtained.

Optionally, the onset temperature of the first crystallization peak of the amorphous alloy is obtained by a differential scanning calorimetry test. In the preparation method of the present application, the onset temperature of the first crystallization peak of the amorphous alloy in step (1) can be obtained by performing a differential scanning calorimetry (DSC) test on the amorphous alloy. The first crystallization peak is the first crystallization peak that appears under the conditions of heating and increasing the temperature of the amorphous alloy. The onset temperature of the first crystallization peak is then used to determine the first stage crystallization temperature and the second stage crystallization temperature in step (2).

Optionally, a heating rate to the crystallization temperature of the second stage in step (2) is 5° C./min-10° C./min, e.g., 5° C./min, 6° C./min, 7° C./min, 8° C./min, 9° C./min or 10° C./min, etc., but it is not limited to the listed values, and other unlisted values within this range of values are also applicable.

Optionally, a holding time at the crystallization temperature of the second stage in step (2) is 30 min-60 min, e.g., 30 min, 35 min, 40 min, 45 min, 50 min, 55 min or 60 min, etc., but it is not limited to the listed values, and other unlisted values within this range of values are also applicable.

As a further optional technical solution of the preparation method described in the present application, the method comprises the following steps:

(11) proportioning the raw material with a purity of more than 99% in a formulation amount, melting the proportioned raw material into alloy ingot at a temperature of 1300° C.-1500° C. under the conditions of vacuuming and/or filling with protective gas;

(12) remelting the alloy ingot in step (11) and then cooling by a single-roll cold method, wherein the cooling rate of the cooling is greater than or equal to $10^{6°}$ C./s, to obtain an amorphous alloy; and (2) under the condition of vacuuming or filling with protective gas, heating the amorphous alloy in step (12) to the crystallization temperature of the first stage at a heating rate of 5° C./min-10° C./min, keeping the temperature for 5 min-30 min, then heating to the crystallization temperature in the second stage at a heating rate of 5° C./min-10° C./min, keeping the temperature for 30 min-60 min, and cooling to obtain the amorphous nanocrystalline soft magnetic material; wherein the crystallization temperature in the first stage is 5° C.-20° C. below the onset temperature of the first crystallization peak of the amorphous alloy in step (12), and the crystallization temperature in the second stage is 30° C.-100° C. above the onset temperature of the first crystallization peak of the amorphous alloy in step (12).

In a third aspect, the present application provides an amorphous ribbon, which is composed of the amorphous alloy prepared in step (1) of the second aspect. Optionally, the amorphous ribbon provided in the present application includes a main component containing Fe, Si, and B and a fine crystalline component containing XC. The amorphous ribbon provided in the present application includes an amorphous matrix phase formed with a main component, and fine crystalline particles formed by solid dissolving in the amorphous phase with a fine crystalline component. The molecular formula of the amorphous ribbon is $Fe_aSi_bB_cCu_dM_e(XC)_f$, where M is at least one selected from the group consisting of Ta, W, Mo, Ge, Zr, Hf, Y and the like; X is at least one of Nb and V; a, b, c, d, e, f respectively represent the atomic percentage content of each corresponding component, wherein $1\leq b\leq12$, $3\leq c\leq10$, $0.5\leq d\leq3$, $1\leq e\leq7$, $0\leq f\leq8$, $0.1\leq h\leq2$, and a+b+c+d+e+f=100.

In a fourth aspect, the present application provides an amorphous nanocrystalline ribbon, which is composed of the amorphous nanocrystalline soft magnetic material described in the first aspect. Because the soft magnetic ribbon provided in the present application is composed of the amorphous nanocrystalline soft magnetic material in the first aspect, its composition and microstructure are the same as the amorphous nanocrystalline soft magnetic material in the first aspect.

In a fifth aspect, the present application provides an amorphous nanocrystalline magnetic sheet, which is prepared from the amorphous nanocrystalline soft magnetic material described in the first aspect. The method for preparing the magnetic sheet can be the method in the prior art, e.g., obtaining by splitting and patching the amorphous nanocrystalline soft magnetic material described in the first aspect.

In a sixth aspect, the present application provides a use of the amorphous nanocrystalline soft magnetic material as described in the first aspect, wherein the amorphous nanocrystalline soft magnetic material is used to prepare a magnetic isolation sheet for wireless charging.

Compared with related art, the present application has the following beneficial effects.

(1) The amorphous nanocrystalline soft magnetic material provided in the present application has a unique structure. The particle size of the nanocrystalline and the particle size of the fine crystalline particles are both extremely small, and the content of each component is appropriate. Thus, the iron-based soft magnetic material provided in the present application can balance saturation magnetic flux density and coercivity. The amorphous nanocrystalline soft magnetic material provided in the present application solves the problem of excessively high coercivity existing in the Fe—Si—B—P—Cu alloy system in the prior art.

(2) The preparation method provided in the present application is divided into two steps in the crystallization step. First, the low-temperature crystallization makes fine crystalline particles with extremely small particle size precipitate, and then the high-temperature crystallization causes the nanocrystalline phase to precipitate and grow, which can ensure that the particle size of the nanocrystalline phase is in the nanometer scale, thereby ensuring that the product can balance the saturation magnetic flux density and coercive force with low magnetic loss. In addition, the preparation method provided in the present application has a short process flow and simple operation, and is suitable for industrialized large-scale production. The preparation method provided in the present application solves the problems of the required fast heating rate and high process difficulty in the method for preparing Fe—Si—B—P—Cu alloy system amorphous nanocrystalline soft magnetic material in the prior art. The method provided in the present application can enhance the effect of inhibiting the growth of nano-crystal grains and reduce the requirement on alloy annealing process. At the same time, the content of P element in the alloy can be reduced due to the addition of XC, so other elements M can be added, which is beneficial to improve the amorphous forming ability, improving the soft magnetic properties of the alloy, such as reducing the coercive force, increasing the magnetic permeability, and reducing the loss.

After reading and understanding the detailed description and drawings, other aspects can be understood.

DETAILED DESCRIPTION

.In order to better explain the present application and facilitate the understanding of the technical solutions of the present application, the present application will be further described in detail hereinafter. However, the following embodiments are only simple examples of the present application, and do not represent or limit the protection scope of the claims of the present application. The protection scope of the present application is defined by the appended claims.

The following are typical but non-limiting examples of the present application.

Example 1

In this example, the amorphous nanocrystalline soft magnetic material was prepared according to the following method.

1. Proportioning: the raw materials with a purity greater than 99% were proportioned according to the alloy composition of $Fe_{80}Si_5B_7Cu_1P_4Zr_2(NbC)_1$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted at 1500° C. by arc melting in an argon atmosphere to obtain an alloy ingot with uniform composition.
3. Amorphous alloy manufacturing: the alloy ingot described in step 2 was remelted, and cooled by a single-roll cold method in a cooling rate above $10^{6}$° C./s to obtain ribbon-shaped amorphous alloy.

Figure 2:
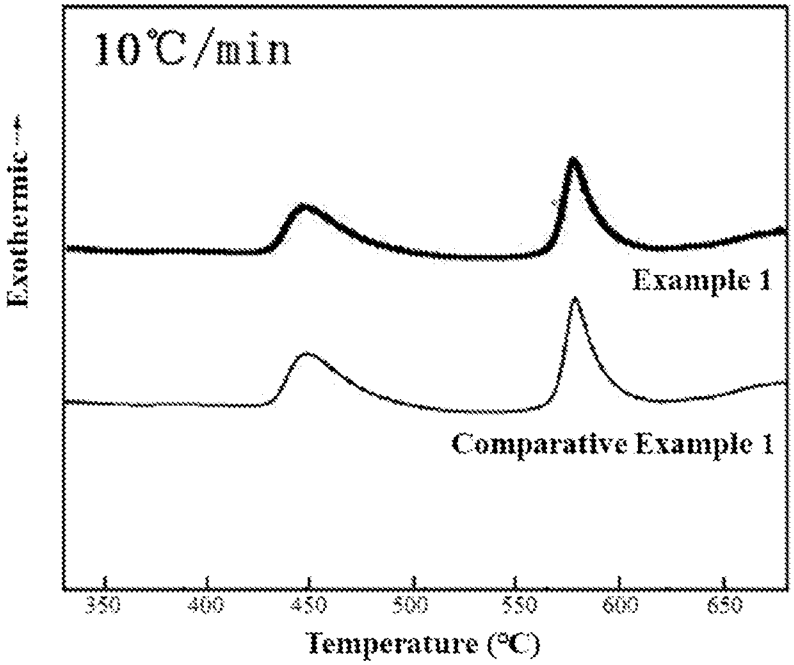
FIG. 2 is the DSC curve of the amorphous alloy obtained after cooling in the preparation methods of Example 1 and Comparative Example 1 in the present application.

The prepared amorphous alloy was subjected to differential scanning calorimeter (DSC) detection, and the DSC curve was obtained as shown by the thick line in FIG. 2. The DSC curve showed that the amorphous alloy had two crystallization peaks, wherein the onset temperature of the first crystallization peak was 428.93° C.

4. Crystallizing: crystallization included the first stage and the second stage, wherein:

the first stage: according to the results of the DSC detecting on the amorphous alloy obtained in step 3, the onset temperature of the first crystallization peak of the amorphous alloy was identified as 428.93° C.; the amorphous alloy was put into the heat treatment furnace; the inside of heat treatment furnace was heated at a heating rate of 8° C./min to 415° C. under high vacuum and kept temperature for 15 minutes; and the second stage: after the first stage crystallization, the inside of heat treatment furnace was heated at a heating rate of 8° C./min to 480° C. and kept temperature for 50 minutes; then the heat treatment furnace was turn off and the amorphous alloy, after the first stage crystallization and the second stage crystallization, was cooled to 150° C. accompanying with the furnace, taken out and subjected to air-cooling to room temperature to obtain an amorphous nanocrystalline soft magnetic material.

X-ray diffraction analysis (XRD) and transmission electron microscopy (TEM) were used to characterize the microstructure of the amorphous nanocrystalline soft magnetic material obtained in this example, and the results are as follows.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80}Si_5B_7Cu_1P_4Zr_2(NbC)_1$, wherein the amorphous matrix phase included Fe, Si, B, Cu, Zr and P; the nanocrystalline phase was α-Fe, which was dispersed in the amorphous matrix phase and had the average particle size of 11.89 nm; the fine crystalline particles included NbC which was dispersed in the amorphous matrix phase and the nanocrystalline phase and had the average particle size of 8.15 nm.

The structural characterization methods in other examples are the same as in this example.

The magnetic properties of the amorphous nanocrystalline soft magnetic material obtained after crystallization in this example were tested, and the results are shown in Table 1.

Figure 1:
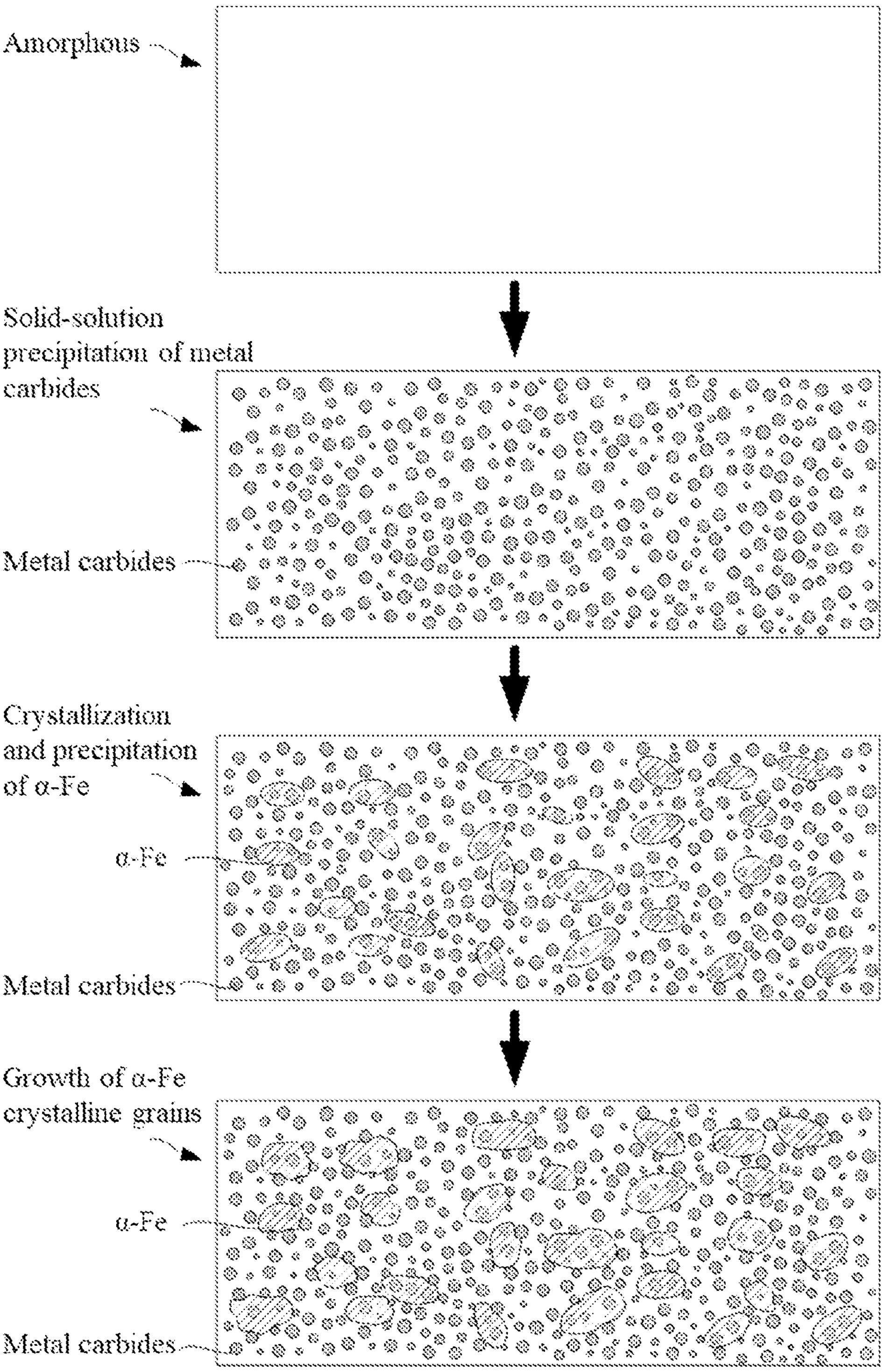
FIG. 1 is a schematic diagram of the influencing principle of NbC on crystal grains during the crystallization process of the amorphous alloy in the preparation method of Example 1 in the present application.

FIG. 1 is a schematic diagram of the influence principle of NbC on crystal grains during the crystallization process of the amorphous alloy in this example. It can be seen from this figure that in the amorphous alloy prepared in step 3, due to the very fast cooling rate during the manufacturing process of the amorphous alloy, the fine crystalline particles (NbC phase) were solid-dissolved in the amorphous matrix. In the first stage crystallization in step 4, the solid solubility of the fine crystalline particles (NbC phase) in the amorphous matrix was reduced due to the holding temperature, and the fine crystalline particles (NbC phase) gradually solid-solution precipitated from the amorphous matrix. Due to the low holding temperature, the aging of fine crystalline particles (NbC phase) was not obvious. The size of the fine crystalline particles (NbC phase) could be maintained at a few nanometers and dispersed in the amorphous matrix. During this process, because the holding temperature was lower than the onset temperature of the first crystallization peak of the amorphous alloy, Fe will not undergo phase transformation, that is, the α-Fe nanocrystalline phase would not undergo crystallization and precipitation. In the second stage of the crystallization in step 4, the α-Fe nanocrystalline phase began to precipitate and grow, but was inhibited from growing since the pinning effect of the dispersed small fine crystalline particles (NbC phase) on the grain boundary hindered the migration of the grain boundary. The finally obtained α-Fe crystal grain size could be maintained at a relatively small nanometer level.

Comparative Example 1

The amorphous nanocrystalline soft magnetic material of this comparative example refers to Example 1, where the difference is that, in step 1, the raw materials with a purity greater than 99% were proportioned according to the $Fe_{80}Si_5B_7Cu_1P_5Zr_2$ alloy composition; in step 4, only one-stage crystallization was performed; the crystallization temperature was calculated according to the onset temperature (427.74° C.) of the first crystallization peak of the amorphous alloy obtained in step 3 of this comparative example; the amorphous alloy was put into the heat treatment furnace, and under high vacuum protection, the inside of heat treatment furnace was heated to 485° C. at a heating rate of 10° C./min, and kept for 45 minutes; then the heat treatment furnace was turn off, and the crystallized amorphous alloy was cooled to 150° C. accompanying with the furnace, taken out and subjected to air-cooling to room temperature.

The specific conditions of the other operation steps of this comparative example are the same as those in Example 1.

The magnetic properties of the amorphous nanocrystalline soft magnetic material obtained after crystallization in this comparative example were tested, and the results are shown in Table 1.

Differential scanning calorimeter (DSC) detection was performed on the amorphous alloy prepared in step 3 of this comparative example, and the DSC curve was obtained as shown by the thin line in FIG. 2. The DSC curve showed that the amorphous alloy had two crystallization peaks, wherein the onset temperature of the first crystallization peak was 427.74° C.

Example 2

In this example, the amorphous nanocrystalline soft magnetic material was prepared according to the following method.

1. Proportioning: the raw materials with a purity greater than 99% were proportioned according to the alloy composition of $Fe_{79}Si_1B_{10}Cu_{0.5}P_6Zr_1Mo_2(NbC)_{0.5}$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted at 1300° C. by arc melting under vacuum to obtain an alloy ingot with uniform composition.
3. Amorphous alloy manufacturing: the alloy ingot described in step 2 was remelted, and prepared into ribbon-shaped amorphous alloy by a single-roll cold method. The prepared amorphous alloy was subjected to differential scanning calorimeter (DSC) detection to obtain the DSC curve. The DSC curve showed that the amorphous alloy had two crystallization peaks, wherein the onset temperature of the first crystallization peak was 388.06° C.
4. Crystallizing: crystallization included the first stage and the second stage, wherein:

the first stage: according to the DSC curve, the onset temperature of the first crystallization peak of the amorphous alloy was identified as 388.06° C.; the amorphous alloy was put into the heat treatment furnace, and the inside of the heat treatment furnace was heated to 379° C. at a heating rate of 10° C./min under high vacuum or inert gas protection and kept temperature for 20 minutes; and the second stage: after the first stage crystallization, the inside of heat treatment furnace was heated to 468° C. at a heating rate of 10° C./min and kept temperature for 30 minutes; then the heat treatment furnace was turn off; the amorphous alloy after the first stage crystallization and the second stage crystallization was cooled to 150° C. accompanying with the furnace, taken out and subjected to air-cooling to room temperature to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{79}Si_1B_{10}Cu_{0.5}P_6Zr_1Mo_2(NbC)_{0.5}$, wherein the amorphous matrix phase included Fe, Si, B, Cu, Zr, Mo and P; the nanocrystalline phase was α-Fe, which was dispersed in the amorphous matrix phase and had the average particle size of 24.57 nm; the fine crystalline particles included NbC which was dispersed in the amorphous matrix phase and the nanocrystalline phase and had the average particle size of 7.79 nm.

The magnetic properties of the amorphous nanocrystalline soft magnetic material obtained after crystallization in this example were tested, and the results are shown in Table 1.

Comparative Example 2

The amorphous nanocrystalline soft magnetic material of this comparative example refers to Example 2, where the difference is that, in step 1, the raw materials with a purity greater than 99% were proportioned according to the $Fe_{79}Si_1B_{10}Cu_{0.5}P_{6.5}Zr_1Mo_2$ alloy composition; in step 4, only one-stage crystallization was performed; the crystallization temperature was calculated according to the onset temperature (390.3° C.) of the first crystallization peak of the amorphous alloy obtained in step 3 of this comparative example; the amorphous alloy was put into the heat treatment furnace, and the inside of heat treatment furnace was heated under the protection of high vacuum to 470° C. at a heating rate of 10° C./min, and kept temperature for 50 minutes; then the heat treatment furnace was turn off, and the crystallized amorphous alloy was cooled to 150° C. accompanying with the furnace, then taken out and subjected to air-cooling to room temperature.

The specific conditions of the other operation steps of this comparative example are the same as those in Example 2.

The magnetic properties of the amorphous nanocrystalline soft magnetic material obtained after crystallization in this comparative example were tested, and the results are shown in Table 1.

Example 3

In this example, the amorphous nanocrystalline soft magnetic material was prepared according to the following method.

1. Proportioning: the raw materials with a purity greater than 99% were proportioned according to the alloy composition of $Fe_{79.5}Si_2B_7Cu_3P_4Ta_1W_1Ge_{0.5}Hf_{1.5}(VC)_{0.5}$, wherein B was added in the form of ferro-boron alloy, P was added in the form of ferro-phosphorus alloy, V was added in the form of ferro-vanadium alloy, and C was added in the form of ferro-carbon alloy.
2. Melting: the proportioned raw materials were put into the crucible of the melting furnace, and melted under vacuum at 1400° C. by the medium-frequency induction melting method to obtain an alloy ingot with uniform composition.
3. Amorphous alloy manufacturing: the alloy ingot described in step 2 was remelted, and prepared into ribbon-shaped amorphous alloy by a single-roll cold method. The prepared amorphous alloy was subjected to differential scanning calorimeter (DSC) detection to obtain the DSC curve. The DSC curve showed that the amorphous alloy had two crystallization peaks, wherein the onset temperature of the first crystallization peak was 398.69° C.
4. Crystallizing: crystallization included the first stage and the second stage, wherein:

the first stage: according to the DSC curve, the onset temperature of the first crystallization peak of the amorphous alloy was identified as 398.69° C.; the amorphous alloy was put into the heat treatment furnace, and the inside of the heat treatment furnace was heated to 390° C. at a heating rate of 7° C./min under the protection of high vacuum and kept temperature for 5 minutes; and the second stage: after the first stage crystallization, the inside of heat treatment furnace was heated to 465° C. at a heating rate of 7° C./min and kept temperature for 40 minutes; then the heat treatment furnace was turn off, and the amorphous alloy after the first stage crystallization and the second stage crystallization was cooled to 150° C. accompanying with the furnace, taken out and subjected to air-cooling to room temperature to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{79.5}Si_2B_7Cu_3P_4Ta_1W_1Ge_{0.5}Hf_{1.5}(VC)_{0.5}$, wherein the amorphous matrix phase included Fe, Si, B, Cu, Ta, W, Ge, Hf and P; the nanocrystalline phase was α-Fe, which was dispersed in the amorphous matrix phase and had the average particle size of 22.19 nm; the fine crystalline particles included VC which was dispersed in the amorphous matrix phase and the nanocrystalline phase and had the average particle size of 7.7 nm.

The magnetic properties of the amorphous nanocrystalline soft magnetic material obtained after crystallization in this example were tested, and the results are shown in Table 1.

Comparative Example 3

The amorphous nanocrystalline soft magnetic material of this comparative example refers to Example 3, where the difference is that, in step 1, the raw materials with a purity greater than 99% were proportioned according to the $Fe_{79.5}Si_2B_7Cu_3P_{4.5}Ta_1W_1Ge_{0.5}Hf_{1.5}$ alloy composition; in step 4, only one-stage crystallization was performed; the crystallization temperature was calculated according to the onset temperature (397.23° C.) of the first crystallization peak of the amorphous alloy obtained in step 3 of this comparative example; the amorphous alloy was put into the heat treatment furnace, and the inside of heat treatment furnace was heated under the protection of high vacuum to 470° C. at a heating rate of 10° C./min, and kept temperature for 50 minutes; then the heat treatment furnace was turn off, and the crystallized amorphous alloy was cooled to 150° C. accompanying with the furnace, then taken out and subjected to air-cooling to room temperature.

The specific conditions of the other operation steps of this comparative example are the same as those in Example 3.

The magnetic properties of the amorphous nanocrystalline soft magnetic material obtained after crystallization in this comparative example were tested, and the results are shown in Table 1.

Example 4

In this example, the amorphous nanocrystalline soft magnetic material was prepared according to the following method.

1. Proportioning: the raw materials with a purity greater than 99% were proportioned according to the alloy composition of $Fe_{78.9}Si_4B_6Cu_1P_2Zr_2Y_1W_2Mo_2Ge_1(NbC)_{0.1}$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted under vacuum at 1400° C. by the high-frequency induction melting method to obtain an alloy ingot with uniform composition.
3. Amorphous alloy manufacturing: the alloy ingot described in step 2 was remelted, and prepared into ribbon-shaped amorphous alloy by a single-roll cold method. The prepared amorphous alloy was subjected to differential scanning calorimeter (DSC) detection to obtain the DSC curve. The DSC curve showed that the amorphous alloy had two crystallization peaks, wherein the onset temperature of the first crystallization peak was 419.6° C.
4. Crystallizing: crystallization included the first stage and the second stage, wherein:

the first stage: according to the DSC curve, the onset temperature of the first crystallization peak of the amorphous alloy was identified as 419.6° C.; the amorphous alloy was put into the heat treatment furnace, and the inside of the heat treatment furnace was heated to 410° C. at a heating rate of 9° C./min under the protection of high vacuum and kept temperature for 18 minutes; and the second stage: after the first stage crystallization, the inside of heat treatment furnace was heated to 460° C. at a heating rate of 9° C./min and kept temperature for 45 minutes; then the heat treatment furnace was turn off, and the amorphous alloy after the first stage crystallization and the second stage crystallization was cooled to 150° C. accompanying with the furnace, taken out and subjected to air-cooling to room temperature to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{78.9}Si_4B_6Cu_1P_2Zr_2Y_1W_2Mo_2Ge_1(NbC)_{0.1}$, wherein the amorphous matrix phase included Fe, Si, B, Cu, Zr, Y, W, Mo, Ge and P; the nanocrystalline phase was α-Fe, which was dispersed in the amorphous matrix phase and had the average particle size of 16.64 nm; the fine crystalline particles included NbC which was dispersed in the amorphous matrix phase and the nanocrystalline phase and had the average particle size of 7.55 nm.

The magnetic properties of the amorphous nanocrystalline soft magnetic material obtained after crystallization in this example were tested, and the results are shown in Table 1.

Comparative Example 4

The amorphous nanocrystalline soft magnetic material of this comparative example refers to Example 4, where the difference is that, in step 1, the raw materials with a purity greater than 99% were proportioned according to the $Fe_{78.9}Si_4B_6Cu_1P_{2.1}Zr_2Y_1W_2Mo_2Ge_1$ alloy composition; in step 4, only one-stage crystallization was performed; the crystallization temperature was calculated according to the onset temperature (420.35° C.) of the first crystallization peak of the amorphous alloy obtained in step 3 of this comparative example; the amorphous alloy was put into the heat treatment furnace; the inside of heat treatment furnace was heated under the protection of high vacuum the to 470° C. at a heating rate of 10° C./min, and kept temperature for 35 minutes; then the heat treatment furnace was turn off, and the crystallized amorphous alloy was cooled to 150° C. accompanying with the furnace, then taken out and subjected to air-cooling to room temperature.

The specific conditions of the other operation steps of this comparative example are the same as those in Example 4.

The magnetic properties of the amorphous nanocrystalline soft magnetic material obtained after crystallization in this comparative example were tested, and the results are shown in Table 1.

Example 5

In this example, the amorphous nanocrystalline soft magnetic material was prepared according to the following method.

1. Proportioning: the raw materials with a purity greater than 99% were proportioned according to the alloy composition of $Fe_{78.5}Si_7B_8Cu_{1.2}P_2Y_1Mo_1Zr_1(NbC)_{0.3}$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted under vacuum at 1400° C. by the arc melting method to obtain an alloy ingot with uniform composition.
3. Amorphous alloy manufacturing: the alloy ingot described in step 2 was melted, and prepared into ribbon-shaped amorphous alloy by a single-roll cold method. The prepared amorphous alloy was subjected to differential scanning calorimeter (DSC) detection to obtain the DSC curve. The DSC curve showed that the amorphous alloy had two crystallization peaks, wherein the onset temperature of the first crystallization peak was 458.63° C.
4. Crystallizing: crystallization included the first stage and the second stage, wherein:

the first stage: according to the DSC curve, the onset temperature of the first crystallization peak of the amorphous alloy was identified as 458.63° C.; the amorphous alloy was put into the heat treatment furnace, and the inside of the heat treatment furnace was heated to 440° C. at a heating rate of 6° C./min under the protection of high vacuum and kept temperature for 25 minutes; and the second stage: after the first stage crystallization, the inside of heat treatment furnace was heated to 510° C. at a heating rate of 6° C./min and kept temperature for 40 minutes; then the heat treatment furnace was turn off, and the amorphous alloy after the first stage crystallization and the second stage crystallization was cooled to 150° C. accompanying with the furnace, taken out and subjected to air-cooling to room temperature to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{78.5}Si_7B_8Cu_{1.2}P_2Y_1Mo_1Zr_1(NbC)_{0.3}$, wherein the amorphous matrix phase included Fe, Si, B, Cu, Y, Mo, Zr and P; the nanocrystalline phase was α-Fe, which was dispersed in the amorphous matrix phase and had the average particle size of 9.51 nm; the fine crystalline particles included NbC which was dispersed in the amorphous matrix phase and the nanocrystalline phase and had the average particle size of 9.05 nm.

The magnetic properties of the amorphous nanocrystalline soft magnetic material obtained after crystallization in this example were tested, and the results are shown in Table 1.

Comparative Example 5

The amorphous nanocrystalline soft magnetic material of this comparative example refers to Example 5, where the difference is that, in step 1, the raw materials with a purity greater than 99% were proportioned according to the $Fe_{78.5}Si_7B_8Cu_{1.2}P_{2.3}Y_1Mo_1Zr_1$ alloy composition; in step 4, only one-stage crystallization was performed; the crystallization temperature was calculated according to the onset temperature (457.69° C.) of the first crystallization peak of the amorphous alloy obtained in step 3 of this comparative example; the amorphous alloy was put into the heat treatment furnace; the inside of heat treatment furnace was heated under the protection of high vacuum to 500° C. at a heating rate of 10° C./min, and kept temperature for 40 minutes; then the heat treatment furnace was turn off, the crystallized amorphous alloy was cooled to 150° C. accompanying with the furnace, then taken out and subjected to air-cooling to room temperature.

The specific conditions of the other operation steps of this comparative example are the same as those in Example 5.

The magnetic properties of the amorphous nanocrystalline soft magnetic material obtained after crystallization in this comparative example were tested, and the results are shown in Table 1.

Example 6

In this example, the amorphous nanocrystalline soft magnetic material was prepared according to the following method.

1. Proportioning: the raw materials with a purity greater than 99% were proportioned according to the alloy composition of $Fe_{76.95}Si_4B_7Cu_{1.25}P_4Mo_1Ge_1Zr_2Y_2(VC)_{0.8}$, wherein B was added in the form of ferro-boron alloy, P was added in the form of ferro-phosphorus alloy, V was added in the form of ferro-vanadium alloy, and C was added in the form of ferro-carbon alloy.
2. Melting: the proportioned raw materials were put into the crucible of the melting furnace, and melted under vacuum at 1400° C. by the arc melting method to obtain an alloy ingot with uniform composition.
3. Amorphous alloy manufacturing: the alloy ingots described in step 2 was remelted, and prepared into ribbon-shaped amorphous alloy by a single-roll cold method. The prepared amorphous alloy was subjected to differential scanning calorimeter (DSC) detection to obtain the DSC curve. The DSC curve showed that the amorphous alloy had two crystallization peaks, wherein the onset temperature of the first crystallization peak was 420.63° C.
4. Crystallizing: crystallization included the first stage and the second stage, wherein:

the first stage: according to the DSC curve, the onset temperature of the first crystallization peak of the amorphous alloy was identified as 420.63° C.; the amorphous alloy was put into the heat treatment furnace, and the inside of the heat treatment furnace was heated to 410° C. at a heating rate of 7° C./min under the protection of high vacuum and kept temperature for 20 minutes; and the second stage: after the first stage crystallization, the inside of heat treatment furnace was heated to 475° C. at a heating rate of 7° C./min and kept temperature for 45 minutes; then the heat treatment furnace was turn off, and the amorphous alloy after the first stage crystallization and the second stage crystallization was cooled to 150° C. accompanying with the furnace, taken out and subjected to air-cooling to room temperature to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{76.95}Si_4B_7Cu_{1.25}P_4Mo_1Ge_1Zr_2Y_2(VC)_{0.8}$, wherein the amorphous matrix phase included Fe, Si, B, Cu, Mo, Ge, Zr, Y and P; the nanocrystalline phase was α-Fe, which was dispersed in the amorphous matrix phase and had the average particle size of 16.64 nm; the fine crystalline particles included VC which was dispersed in the amorphous matrix phase and the nanocrystalline phase and had the average particle size of 8 nm.

The magnetic properties of the amorphous nanocrystalline soft magnetic material obtained after crystallization in this example were tested, and the results are shown in Table 1.

Comparative Example 6

The amorphous nanocrystalline soft magnetic material of this comparative example refers to Example 6, where the difference is that, in step 1, the raw materials with a purity greater than 99% were proportioned according to the $Fe_{76.95}Si_4B_7Cu_{1.25}P_{4.8}Mo_1Ge_1Zr_2Y_2$ alloy composition; in step 4, only one-stage crystallization was performed; the crystallization temperature was calculated according to the onset temperature (418.96° C.) of the first crystallization peak of the amorphous alloy obtained in step 3 of this comparative example; the amorphous alloy was put into the heat treatment furnace, and the inside of heat treatment furnace was heated under the protection of high vacuum to 465° C. at a heating rate of 10° C./min, and kept temperature for 45 minutes; then the heat treatment furnace was turn off, and the crystallized amorphous alloy was cooled to 150° C. accompanying with the furnace, then taken out and subjected to air-cooling to room temperature.

The specific conditions of the other operation steps of this comparative example are the same as those in Example 6.

The magnetic properties of the amorphous nanocrystalline soft magnetic material obtained after crystallization in this comparative example were tested, and the results are shown in Table 1.

Example 7

In this example, the amorphous nanocrystalline soft magnetic material was prepared according to the following method.

Figure 3:
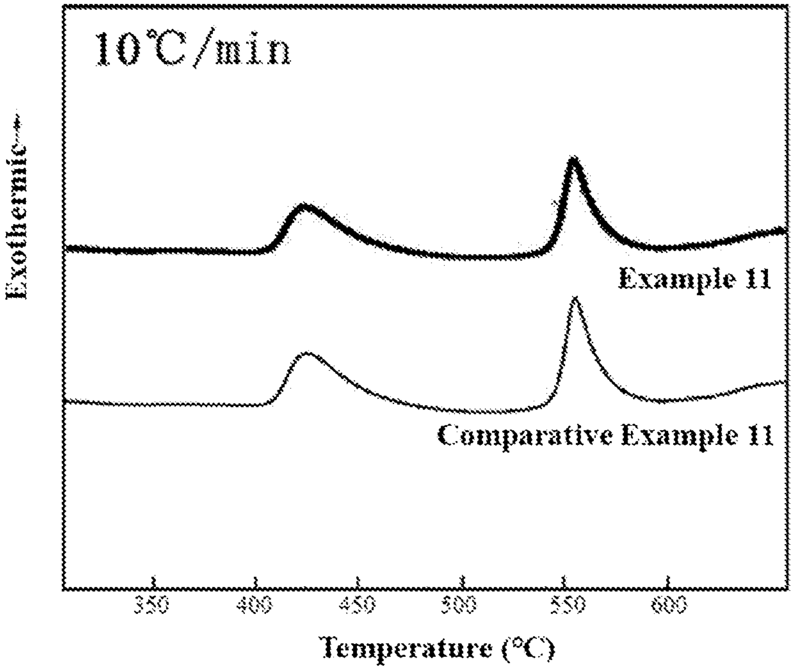
FIG. 3 is the DSC curve of the amorphous alloy obtained after cooling in the preparation methods of Example 7 and Comparative Example 7 of in the present application.

1. Proportioning: the raw materials with a purity greater than 99% were proportioned according to the alloy composition of $Fe_{74}Si_2B_6Cu_{25}P_6Mo_2Ge_1Zr_3Y_2(NbC)_{1.5}$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted in a nitrogen atmosphere at 1400° C. by the arc melting method to obtain an alloy ingot with uniform composition.
3. Amorphous alloy manufacturing: the alloy ingot described in step 2 was remelted, and prepared into ribbon-shaped amorphous alloy by a single-roll cold method. The prepared amorphous alloy was subjected to differential scanning calorimeter (DSC) detection to obtain the DSC curve shown by the thick line in FIG. 3. The DSC curve showed that the amorphous alloy had two crystallization peaks, wherein the onset temperature of the first crystallization peak was 400.25° C.
4. Crystallizing: crystallization included the first stage and the second stage, wherein:

the first stage: according to the DSC curve shown by the thick line in FIG. 3, the onset temperature of the first crystallization peak of the amorphous alloy was 400.25° C.; the amorphous alloy was put into the heat treatment furnace, and the inside of the heat treatment furnace was heated to 386° C. at a heating rate of 8° C./min in a nitrogen atmosphere and kept temperature for 15 minutes; and the second stage: after the first stage crystallization, the inside of heat treatment furnace was heated to 460° C. at a heating rate of 8° C./min and kept temperature for 40 minutes; then the heat treatment furnace was turn off, and the amorphous alloy after the first stage crystallization and the second stage crystallization was cooled to room temperature accompanying with the furnace, then taken out to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{74}Si_2B_6Cu_{2.5}P_6Mo_2Ge_1Zr_3Y_2(NbC)_{1.5}$, wherein the amorphous matrix phase included Fe, Si, B, Cu, Mo, Ge, Zr, Y, P, and NbC; the nanocrystalline phase was α-Fe, which was dispersed in the amorphous matrix phase and had the average particle size of 15.06 nm; the fine crystalline particles included NbC which was dispersed in the amorphous matrix phase and the nanocrystalline phase and had the average particle size of 7.58 nm.

The magnetic properties of the amorphous nanocrystalline soft magnetic material obtained after crystallization in this example were tested, and the results are shown in Table 1.

Comparative Example 7

The amorphous nanocrystalline soft magnetic material of this comparative example refers to Example 7, where the difference is that, in step 1, the raw materials with a purity greater than 99% were proportioned according to the $Fe_{74}Si_2B_6Cu_{2.5}P_{7.5}Mo_2Ge_1Zr_3Y_2$ alloy composition; in step 4, only one-stage crystallization was performed; the crystallization temperature was calculated according to the onset temperature (402.25° C.) of the first crystallization peak of the amorphous alloy obtained in step 3 of this comparative example; the amorphous alloy was put into the heat treatment furnace, and the inside of heat treatment furnace was heated in a nitrogen atmosphere to 450° C. at a heating rate of 10° C./min, and kept temperature for 40 minutes; then the heat treatment furnace was turn off, and the crystallized amorphous alloy was cooled to room temperature accompanying with the furnace and then taken out.

The specific conditions of the other operation steps of this comparative example are the same as those in Example 7.

The magnetic properties of the amorphous nanocrystalline soft magnetic material obtained after crystallization in this comparative example were tested, and the results are shown in Table 1.

Differential scanning calorimeter (DSC) detection was performed on the amorphous alloy prepared in step 3 of this comparative example, and the DSC curve shown by the thin line in FIG. 3 was obtained. The DSC curve showed that the amorphous alloy had two crystallization peaks, and the onset temperature of the first crystallization peak was 402.25° C.

Example 8

In this example, the amorphous nanocrystalline soft magnetic material was prepared according to the following method.

1. Proportioning: the raw materials with a purity greater than 99% were proportioned according to the alloy composition of $Fe_{80.8}Si_5B_5Cu_2P_3Zr_2Hf_1(NbC)_1(VC)_{0.2}$, wherein B was added in the form of ferro-boron alloy, P was added in the form of ferro-phosphorus alloy, Nb was added in the form of ferro-niobium alloy, V was added in the form of ferro-vanadium alloy, and C was added in the form of ferro-carbon alloy.
2. Melting: the proportioned raw materials were put into the crucible of the melting furnace, and melted in a nitrogen atmosphere at 1400° C. by the arc melting method to obtain an alloy ingot with uniform composition.
3. Amorphous alloy manufacturing: the alloy ingot described in step 2 was remelted, and prepared into ribbon-shaped amorphous alloy by a single-roll cold method.

4. Crystallizing: crystallization included the first stage and the second stage, wherein:

the first stage: according to the DSC curve, the onset temperature of the first crystallization peak of the amorphous alloy was identified as 428.45° C.; the amorphous alloy was put into the heat treatment furnace, and the inside of the heat treatment furnace was heated to 409° C. at a heating rate of 5° C./min in a nitrogen atmosphere and kept temperature for 30 minutes; and the second stage: after the first stage crystallization, the inside of heat treatment furnace was heated to 528° C. at a heating rate of 5° C./min and kept temperature for 30 minutes; then the heat treatment furnace was turn off, and the amorphous alloy after the first stage crystallization and the second stage crystallization was cooled to room temperature accompanying with the furnace, and then taken out to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80.8}Si_5B_5Cu_2P_3Zr_2Hf_1(NbC)_1(VC)_{0.2}$, wherein the amorphous matrix phase included Fe, Si, B, Cu, Zr, Hf and P; the nanocrystalline phase was α-Fe, which was dispersed in the amorphous matrix phase and had the average particle size of 12.68 nm; the fine crystalline particles included NbC and VC which were both dispersed in the amorphous matrix phase and the nanocrystalline phase, and had the average particle size of 9.32 nm and 9.67 nm respectively.

The magnetic properties of the amorphous nanocrystalline soft magnetic material obtained after crystallization in this example were tested, and the results are shown in Table 1.

Comparative Example 8

The amorphous nanocrystalline soft magnetic material of this comparative example refers to Example 8, where the difference is that, in step 1, the raw materials with a purity greater than 99% were proportioned according to the $Fe_{80.8}Si_5B_5Cu_2P_{3.2}Zr_2Hf_1$ alloy composition; in step 4, only one-stage crystallization was performed; the crystallization temperature was calculated according to the onset temperature (429.34° C.) of the first crystallization peak of the amorphous alloy obtained in step 3 of this comparative example; the amorphous alloy was put into the heat treatment furnace, and the inside of heat treatment furnace was heated in a nitrogen atmosphere to 495° C. at a heating rate of 10° C./min, and kept temperature for 40 minutes; then the heat treatment furnace was turn off, and the crystallized amorphous alloy was cooled to room temperature accompanying with the furnace, and then taken out.

The specific conditions of the other operation steps of this comparative example are the same as those in Example 8.

The magnetic properties of the amorphous nanocrystalline soft magnetic material obtained after crystallization in this comparative example were tested, and the results are shown in Table 1.

Example 9

In this example, the amorphous nanocrystalline soft magnetic material was prepared according to the following method.

1. Proportioning: the raw materials with a purity greater than 99% were proportioned according to the alloy composition of $Fe_{75.5}Si_4B_8Cu_{1.5}P_5W_1Mo_1Zr_2(NbC)_1(VC)_1$, wherein B was added in the form of ferro-boron alloy, P was added in the form of ferro-phosphorus alloy, Nb was added in the form of ferro-niobium alloy, V was added in the form of ferro-vanadium alloy, and C was added in the form of ferro-carbon alloy.
2. Melting: the proportioned raw materials were put into the crucible of the melting furnace, and melted in a nitrogen atmosphere at 1400° C. by the arc melting method to obtain an alloy ingot with uniform composition.
3. Amorphous alloy manufacturing: the alloy ingot described in step 2 was remelted, and prepared into ribbon-shaped amorphous alloy by a single-roll cold method.
4. Crystallizing: crystallization included the first stage and the second stage, wherein:

the first stage: according to the DSC curve, the onset temperature of the first crystallization peak of the amorphous alloy was identified as 421.42° C.; the amorphous alloy was put into the heat treatment furnace, and the inside of the heat treatment furnace was heated to 408° C. at a heating rate of 7° C./min in a nitrogen atmosphere and kept temperature for 25 minutes; and the second stage: after the first stage crystallization, the inside of heat treatment furnace was heated to 470° C. at a heating rate of 7° C./min and kept temperature for 50 minutes; then the heat treatment furnace was turn off, and the amorphous alloy after the first stage crystallization and the second stage crystallization was cooled to room temperature accompanying with the furnace, and taken out to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{75.5}Si_4B_8Cu_{1.5}P_5W_1Mo_1Zr_2(NbC)_1(VC)_1$, wherein the amorphous matrix phase included Fe, Si, B, Cu, W, Mo, Zr and P; the nanocrystalline phase was α-Fe, which was dispersed in the amorphous matrix phase and had the average particle size of 12.56 nm; the fine crystalline particles included NbC and VC which were dispersed in the amorphous matrix phase and the nanocrystalline phase, and had the average particle size of 7.65 nm and 7.93 nm respectively.

The magnetic properties of the amorphous nanocrystalline soft magnetic material obtained after crystallization in this example were tested, and the results are shown in Table 1.

Comparative Example 9

The amorphous nanocrystalline soft magnetic material of this comparative example refers to Example 9, where the difference is that, in step 1, the raw materials with a purity greater than 99% were proportioned according to the $Fe_{7.55}Si_4B_8Cu_{1.5}P_7W_1Mo_1Zr_2$ alloy composition; in step 4, only one-stage crystallization was performed; the crystallization temperature was calculated according to the onset temperature (421.21° C.) of the first crystallization peak of the amorphous alloy obtained in step 3 of this comparative example; the amorphous alloy was put into the heat treatment furnace, and the inside of heat treatment furnace was heated in a nitrogen atmosphere to 470° C. at a heating rate of 10° C./min, and kept temperature for 45 minutes; then the heat treatment furnace was turn off, and the crystallized amorphous alloy was cooled to room temperature accompanying with the furnace, and then taken out.

The specific conditions of the other operation steps of this comparative example are the same as those in Example 9.

The magnetic properties of the amorphous nanocrystalline soft magnetic material obtained after crystallization in this comparative example were tested, and the results are shown in Table 1.

Example 10

In this example, the amorphous nanocrystalline soft magnetic material was prepared according to the following method.

1. Proportioning: the raw materials with a purity greater than 99% were proportioned according to the alloy composition of $Fe_{83.2}Si_{12}B_3Cu_{0.5}P_1(NbC)_{0.3}$, wherein B was added in the form of ferro-boron alloy, P was added in the form of ferro-phosphorus alloy, Nb was added in the form of ferro-niobium alloy, and C was added in the form of ferro-carbon alloy.
2. Melting: the proportioned raw materials were put into the crucible of the melting furnace, and melted in a nitrogen atmosphere at 1400° C. by the arc melting method to obtain an alloy ingot with uniform composition.
3. Amorphous alloy manufacturing: the alloy ingot described in step 2 was remelted, and prepared into ribbon-shaped amorphous alloy by a single-roll cold method.
4. Crystallizing: crystallization included the first stage and the second stage, wherein:

the first stage: according to the DSC curve, the onset temperature of the first crystallization peak of the amorphous alloy was identified as 488.24° C.; the amorphous alloy was put into the heat treatment furnace, and the inside of the heat treatment furnace was heated to 475° C. at a heating rate of 5° C./min in a nitrogen atmosphere and kept temperature for 25 minutes; and the second stage: after the first stage crystallization, the inside of heat treatment furnace was heated to 540° C. at a heating rate of 5° C./min and kept temperature for 35 minutes; then the heat treatment furnace was turn off, and the amorphous alloy after the first stage crystallization and the second stage crystallization was cooled to room temperature accompanying with the furnace, and then taken out to obtain an amorphous nanocrystalline soft magnetic material.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{83.2}Si_{12}B_3Cu_{0.5}P_1(NbC)_{0.3}$, wherein the amorphous matrix phase included Fe, Si, B, Cu and P; the nanocrystalline phase was α-Fe, which was dispersed in the amorphous matrix phase and had the average particle size of 8.19 nm; the fine crystalline particles included NbC which was dispersed in the amorphous matrix phase and the nanocrystalline phase and had the average particle size of 9.95 nm.

The magnetic properties of the amorphous nanocrystalline soft magnetic material obtained after crystallization in this example were tested, and the results are shown in Table 1.

Comparative Example 10

The amorphous nanocrystalline soft magnetic material of this comparative example refers to Example 10, where the difference is that, in step 1, the raw materials with a purity greater than 99% were proportioned according to the $Fe_{83.2}Si_{12}B_3Cu_{0.5}P_{1.3}$ alloy composition; in step 4, only one-stage crystallization was performed; the crystallization temperature was calculated according to the onset temperature (487.35° C.) of the first crystallization peak of the amorphous alloy obtained in step 3 of this comparative example; the amorphous alloy was put into the heat treatment furnace, and the inside of heat treatment furnace was heated in a nitrogen atmosphere to 550° C. at a heating rate of 10° C./min, and kept temperature for 40 minutes; then the heat treatment furnace was turn off, and the crystallized amorphous alloy was cooled to room temperature accompanying with the furnace, and then taken out.

The specific conditions of the other operation steps of this comparative example are the same as those in Example 10.

The magnetic properties of the amorphous nanocrystalline soft magnetic material obtained after crystallization in this comparative example were tested, and the results are shown in Table 1.

Example 11

Except that the crystallization temperature of the first stage crystallization in step 4 is 434° C. (5.07° C. above the onset temperature of the first crystallization peak of the amorphous alloy), all other operations and operating parameters, raw material proportions and the like in this example were the same as those in the preparation method of the amorphous nanocrystalline soft magnetic material in Example 1.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80}Si_5B_7Cu_1P_4Zr_2(NbC)_1$, wherein the amorphous matrix phase included Fe, Si, B, Cu, Zr and P; the nanocrystalline phase was α-Fe, which was dispersed in the amorphous matrix phase and had the average particle size of 15.58 nm; the fine crystalline particles included NbC which was dispersed in the amorphous matrix phase and the nanocrystalline phase and had the average particle size of 8.1 nm.

Example 12

Except that the crystallization temperature of the first stage crystallization in step 4 is 400° C. (28.93° C. below the onset temperature of the first crystallization peak of the amorphous alloy), all other operations and operating parameters, raw material proportions and the like in this example were the same as those in the preparation method of the amorphous nanocrystalline soft magnetic material in Example 1.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80}Si_5B_7Cu_1P_4Zr_2(NbC)_1$, wherein the amorphous matrix phase included Fe, Si, B, Cu, Zr and P; the nanocrystalline phase was α-Fe, which was dispersed in the amorphous matrix phase and had the average particle size of 16.11 nm; the fine crystalline particles included NbC which was dispersed in the amorphous matrix phase and the nanocrystalline phase and had the average particle size of 8.15 nm.

Example 13

Except that the crystallization temperature of the first stage crystallization in step 4 is 440° C. (11.07° C. above the onset temperature of the first crystallization peak of the amorphous alloy), all other operations and operating parameters, raw material proportions and the like in this example were the same as those in the preparation method of the amorphous nanocrystalline soft magnetic material in Example 1.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80}Si_5B_7Cu_1P_4Zr_2(NbC)_1$, wherein the amorphous matrix phase included Fe, Si, B, Cu, Zr and P; the nanocrystalline phase was α-Fe which was dispersed in the amorphous matrix phase, grew incompletely and had the average particle size of 10.21 nm; the fine crystalline particles included NbC which was dispersed in the amorphous matrix phase and the nanocrystalline phase and had the average particle size of 6.95 nm.

Example 14

Except that the crystallization temperature of the first stage crystallization in step 4 is 560° C. (131.07° C. above the onset temperature of the first crystallization peak of the amorphous alloy), all other operations and operating parameters, raw material proportions and the like in this example were the same as those in the preparation method of the amorphous nanocrystalline soft magnetic material in Example 1.

The amorphous nanocrystalline soft magnetic material prepared in this example included an amorphous matrix phase, a nanocrystalline phase distributed in the amorphous matrix phase, and fine crystalline particles dispersed in the amorphous matrix phase and the nanocrystalline phase. The molecular formula of the amorphous nanocrystalline soft magnetic material was $Fe_{80}Si_5B_7Cu_1P_4Zr_2(NbC)_1$, wherein the amorphous matrix phase included Fe, Si, B, Cu, Zr and P, and further included a part of the second phase such as $Fe_2B$ and the like; the nanocrystalline phase was α-Fe which was dispersed in the amorphous matrix phase, and had the average particle size of 21.83 nm; the fine crystalline particles included NbC which was dispersed in the amorphous matrix phase and the nanocrystalline phase and had the average particle size of 10.55 nm.

Comparative Example 11

The preparation method of the amorphous nanocrystalline soft magnetic material in this comparative example refers to Example 1, where the difference is that, in step 1, raw materials with a purity greater than 99% were proportioned according to the $Fe_{81}Si_5B_7Cu_1P_4Zr_2$ alloy composition; the crystallization temperatures of the first and second stages of crystallization in step 4 were both calculated according to the onset temperature (428.33° C.) of the first crystallization peak of the amorphous alloy obtained in step 3 in this comparative example; the specific value, which the crystallization temperature of the first stage in this comparative example was lower than the onset temperature of the first crystallization peak in this comparative example, was the same as the difference value between the first stage crystallization temperature in Example 1 and the onset temperature of the first crystallization peak of the amorphous alloy in Example 1, and the specific value, which the crystallization temperature of the second stage in this comparative example was higher than the onset temperature of the first crystallization peak of the amorphous alloy in this comparative example, was the same as the difference value between the second stage crystallization temperature in Example 1 and the onset temperature of the first crystallization peak of the amorphous alloy in Example 1.

The specific conditions of the other operation steps of this comparative example are the same as those in Example 1.

The magnetic properties of the amorphous nanocrystalline soft magnetic material obtained after crystallization in this comparative example were tested, and the results are shown in Table 1.

Performance Test Method

A vibrating sample magnetometer (VSM) was used to test the saturation magnetic induction intensity of the amorphous nanocrystalline soft magnetic materials prepared in each example and comparative example at room temperature.

The coercive force of the amorphous nanocrystalline soft magnetic materials prepared in each example and comparative example was tested by using the soft magnetic direct current magnetic performance measurement system instrument at room temperature.

The test results are shown in the table below.

TABLE 1

| No. | Molecular formulae | Saturation magnetic induction (T) | Coercivity (A/m) |
|---|---|---|---|
| Example 1 | $Fe_{80}Si_5B_7Cu_1P_4Zr_2(NbC)_1$ | 1.71 | 4.5 |
| Comparative Example 1 | $Fe_{80}Si_5B_7Cu_1P_5Zr_2$ | 1.70 | 18.9 |
| Example 2 | $Fe_{79}Si_1B_{10}Cu_{0.5}P_6Zr_1Mo_2(NbC)_{0.5}$ | 1.94 | 9.3 |

TABLE 1-continued

| No. | Molecular formulae | Saturation magnetic induction (T) | Coercivity (A/m) |
|---|---|---|---|
| Comparative Example 2 | $Fe_{79}Si_1B_{10}Cu_{0.5}P_{6.5}Zr_1Mo_2$ | 1.93 | 23.4 |
| Example 3 | $Fe_{79.5}Si_2B_7Cu_3P_4Ta_1W_1Ge_{0.5}Hf_{1.5}(VC)_{0.5}$ | 1.88 | 8.4 |
| Comparative Example 3 | $Fe_{79.5}Si_2B_7Cu_3P_{4.5}Ta_1W_1Ge_{0.5}Hf_{1.5}$ | 1.86 | 21.6 |
| Example 4 | $Fe_{78.9}Si_4B_6Cu_1P_2Zr_2Y_1W_2Mo_2Ge_1(NbC)_{0.1}$ | 1.76 | 6.3 |
| Comparative Example 4 | $Fe_{78.9}Si_4B_6Cu_1P_{2.1}Zr_2Y_1W_2Mo_2Ge_1$ | 1.74 | 20.7 |
| Example 5 | $Fe_{78.5}Si_7B_8Cu_{1.2}P_2Y_1Mo_1Zr_1(NbC)_{0.3}$ | 1.55 | 3.6 |
| Comparative Example 5 | $Fe_{78.5}Si_7B_8Cu_{1.2}P_{2.3}Y_1Mo_1Zr_1$ | 1.53 | 17.3 |
| Example 6 | $Fe_{76.95}Si_4B_7Cu_{1.25}P_4Mo_1Ge_1Zr_2Y_2(VC)_{0.8}$ | 1.76 | 6.3 |
| Comparative Example 6 | $Fe_{76.95}Si_4B_7Cu_{1.25}P_{4.8}Mo_1Ge_1Zr_2Y_2$ | 1.74 | 20.8 |
| Example 7 | $Fe_{74}Si_2B_6Cu_{2.5}P_6Mo_2Ge_1Zr_3Y_2(NbC)_{1.5}$ | 1.87 | 5.7 |
| Comparative Example 7 | $Fe_{74}Si_2B_6Cu_{2.5}P_{7.5}Mo_2Ge_1Zr_3Y_2$ | 1.84 | 23.2 |
| Example 8 | $Fe_{80.8}Si_5B_5Cu_2P_3Zr_2Hf_1(NbC)_1(VC)_{0.2}$ | 1.71 | 4.8 |
| Comparative Example 8 | $Fe_{80.8}Si_5B_5Cu_2P_{3.2}Zr_2Hf_1$ | 1.70 | 20.6 |
| Example 9 | $Fe_{75.5}Si_4B_8Cu_{1.5}P_5W_1Mo_1Zr_2(NbC)_1(VC)_1$ | 1.75 | 4.8 |
| Comparative Example 9 | $Fe_{75.5}Si_4B_8Cu_{1.5}P_7W_1Mo_1Zr_2$ | 1.72 | 20.7 |
| Example 10 | $Fe_{83.2}Si_{12}B_3Cu_{0.5}P_1(NbC)_{0.3}$ | 1.38 | 3.1 |
| Comparative Example 10 | $Fe_{83.2}Si_{12}B_3Cu_{0.5}P_{1.3}$ | 1.35 | 19.3 |
| Example 11 | $Fe_{80}Si_5B_7Cu_1P_4Zr_2(NbC)_1$ | 1.71 | 5.9 |
| Example 12 | $Fe_{80}Si_5B_7Cu_1P_4Zr_2(NbC)_1$ | 1.71 | 6.1 |
| Example 13 | $Fe_{80}Si_5B_7Cu_1P_4Zr_2(NbC)_1$ | 1.7 | 9.0 |
| Example 14 | $Fe_{80}Si_5B_7Cu_1P_4Zr_2(NbC)_1$ | 1.7 | 20.9 |
| Comparative Example 11 | $Fe_{81}Si_5B_7Cu_1P_4Zr_2$ | 1.72 | 19.3 |

Based on the examples and comparative examples hereinabove, it can be seen that in Examples 1-10, due to the existence of metal carbide fine crystalline particles, the phosphorus-containing soft magnetic material provided in the present application solves the problem of excessively high coercivity in the phosphorus-containing soft magnetic material in the prior art, balances the saturation magnetic induction and coercivity of the phosphorus-containing soft magnetic material, and improves the comprehensive magnetic properties of the phosphorus-containing nanocrystalline soft magnetic material.

The temperature in the first stage crystallization in Example 11 was too high, resulting in the premature precipitation of the nanocrystalline phase, while NbC fine-crystalline particles could not effectively inhibit the growth of the nanocrystalline grains, so as to affect the product performance.

The temperature in the first stage crystallization in Example 12 was too low, resulting in that the NbC fine crystalline particles failed to precipitate in a large amount, which did not have the effect of inhibiting the growth of nanocrystalline grains and affected the product performance.

The temperature in the second stage crystallization in Example 13 was too low, resulting in the precipitation of other second phases, such as $Fe_2B$, which were unfavorable to the magnetic properties, and deterioration of the magnetic properties.

The temperature in the second stage crystallization in Example 14 was too high, resulting in incomplete formation of nanocrystalline grains, and a small content of nanocrystalline phases, which could not obtain the best magnetic properties.

Comparative Examples 1-11 did not add the raw materials that made up XC, and only carried out one-stage crystallization. This resulted in not having enough fine crystalline particles in the product obtained in Comparative Examples 1-11, so that it was unable to pin the grain boundary during the crystallization stage, and could not hinder the migration of grain boundaries or effectively inhibit the growth of α-Fe nanocrystalline phase. At the same time, Comparative Examples 1-11 failed to use a fast heating rate during the crystallization process due to the difficulty of the process. Therefore, even if P element is added to the alloy composition of Comparative Examples 1-11, P element can hardly hinder the movement of grain boundaries, and the effect of fining crystalline is poor. Therefore, the product performance of Comparative Examples 1-11 cannot reach the excellent level of the corresponding examples, and there is the problem of excessively high coercivity, which is common in existing phosphorus-containing soft magnetic materials.

Although Comparative Example 11 merely didn't add C and Nb raw materials, which resulted in that the metal carbide could not be formed, this already prevented the Comparative Example 11 from producing enough fine crystalline particles of metal carbide. Although Comparative Example 11 used the same two-stage crystallization as Example 1, the coercivity of the product is too high to reach the level of Example 1.

The applicant declares that although the detailed methods of the present application are illustrated by the examples described above, the present application is not limited to the detailed methods described above, which means that the present application does not rely on the detailed methods described above to be implemented.

What is claimed is:

1. An amorphous nanocrystalline soft magnetic material, comprising an amorphous matrix phase, a nanocrystalline phase distributed in the amorphous matrix phase, and a fine crystalline particle distributed in the amorphous matrix phase and the nanocrystalline phase, wherein the amorphous matrix phase comprises Fe, Si and B; the fine crystalline particle comprises metal carbides; and the amorphous nanocrystalline soft magnetic material comprises Fe, Si, B, P and Cu;

wherein the fine crystalline particle has an average particle size of less than or equal to 10 nm and the nanocrystalline phase has an average particle size of less than or equal to 30 nm;

wherein in the amorphous nanocrystalline soft magnetic material, the nanocrystalline phase has an atomic percentage of 50 at % to 70 at %; and in the amorphous nanocrystalline soft magnetic material, the fine crystalline particle has an atomic percentage of 0.1 at % to 2 at %.

2. The amorphous nanocrystalline soft magnetic material according to claim 1, wherein the amorphous nanocrystalline soft magnetic material has a molecular formula of $Fe_aSi_bB_cCu_dP_eM_f(XC)_h$, wherein M is selected from any one or a combination of at least two of Ta, W, Mo, Ge, Zr, Hf or Y; X is Nb and/or V; $1 \leq b \leq 12$, $3 \leq c \leq 10$, $0.5 \leq d \leq 3$, $1 \leq e \leq 7$, $0 \leq f \leq 8$, $0.1 \leq h \leq 2$, and $a+b+c+d+e+f+h=100$.

3. The amorphous nanocrystalline soft magnetic material according to claim 2, wherein the amorphous matrix phase further comprises M.

4. The amorphous nanocrystalline soft magnetic material according to claim 2, wherein the amorphous matrix phase further comprises P and Cu.

5. The amorphous nanocrystalline soft magnetic material according to claim 4, wherein the nanocrystalline phase comprises α-Fe.

6. The amorphous nanocrystalline soft magnetic material according to claim 4, wherein the metal carbide is XC.

7. The amorphous nanocrystalline soft magnetic material according to claim 1, wherein the nanocrystalline phase has the average particle size of 10 nm to 20 nm.

8. The amorphous nanocrystalline soft magnetic material according to claim 7, wherein the fine crystalline particle has an average particle size of 5 nm to 8 nm.

9. A preparation method for the amorphous nanocrystalline soft magnetic material according to claim 1, wherein the method comprises the following steps:

(1) proportioning a raw material of formulation amount followed by preparing an amorphous alloy; and (2) subjecting the amorphous alloy described in step (1) to a two-stage crystallization under a protective condition, and cooling to obtain the amorphous nanocrystalline soft magnetic material, wherein the crystallization temperature of the second stage is higher than the crystallization temperature of the first stage.

10. The preparation method according to claim 9, wherein the crystallization temperature of the first stage in step (2) is 5° C. to 20° C. below the onset temperature of the first crystallization peak of the amorphous alloy in step (1).

11. The preparation method according to claim 9, wherein, optionally, the crystallization temperature of the second stage in step (2) is 30° C. to 100° C. above the onset temperature of the first crystallization peak of the amorphous alloy in step (1).

12. The preparation method according to claim 9, wherein a method of preparing the amorphous alloy in step (1) comprises the following steps:

(11) melting the proportioned raw material under a protective condition to obtain an alloy liquid or an alloy ingot;

(12) cooling the alloy liquid in step (11) to obtain the amorphous alloy; or remelting the alloy ingot in step (11) and cooling to obtain the amorphous alloy;

optionally, a purity of the raw material in step (11) is greater than 99 wt. %;

optionally, the protective condition in step (11) includes vacuum or protective gas;

optionally, the protective gas includes nitrogen or argon;

optionally, a temperature of melting in step (11) is 1300° C. to 1500° C.;

optionally, a method of melting in step (11) includes any one of arc melting, intermediate frequency induction melting or high frequency induction melting;

optionally, a cooling rate of cooling in step (12) is greater than or equal to $10^{6}$° C./s;

optionally, a method of cooling in step (12) includes a single-roll cold method, a copper mold blow-casting method, a copper mold suction casting method or a Taylor method, and optionally, the single-roll cold method;

optionally, the protective condition in step (2) includes vacuum or protective gas;

optionally, the protective gas includes nitrogen and/or argon;

optionally, a heating rate to the crystallization temperature of the first stage in step (2) is 5° C./min to 10° C./min;

optionally, a holding time at the crystallization temperature of the first stage in step (2) is 5 min to 30 min;

optionally, the onset temperature of the first crystallization peak of the amorphous alloy is measured and obtained by a differential scanning calorimetry;

optionally, a heating rate to the crystallization temperature of the second stage in step (2) is 5° C./min to 10° C./min;

optionally, a holding time at the crystallization temperature of the second stage in step (2) is 30 min to 60 min.

13. The preparation method according to claim 9, wherein the method comprises the following steps:

(11) proportioning the raw material with a purity of more than 99% in a formulation amount, melting the proportioned raw material into alloy ingot at a temperature of 1300° C. to 1500° C. under a condition of vacuuming and/or filling with protective gas;

(12) remelting the alloy ingot in step (11) and then cooling the melt by the single-roll cold method, wherein a cooling rate of the cooling is greater than or equal to $10^{6}$° C./s, to obtain an amorphous alloy; and (2) under a condition of vacuuming or filling with protective gas, heating the amorphous alloy in step (12) to a crystallization temperature of the first stage at a heating rate of 5° C./min to 10° C./min, keeping the temperature for 5 min to 30 min, then heating to a crystallization temperature in the second stage at a heating rate of 5° C./min to 10° C./min, keeping the temperature for 30 min to 60 min, and cooling to obtain the amorphous nanocrystalline soft magnetic material; wherein the crystallization temperature in the first stage is 5° C. to 20° C. below the onset temperature of the first crystallization peak of the amorphous alloy in step (12), and the crystallization temperature in the second stage is 30° C. to 100° C. above the onset temperature of the first crystallization peak of the amorphous alloy in step (12).

14. An amorphous ribbon, wherein the amorphous ribbon is composed of the amorphous alloy prepared in step (1) of the preparation method according to claim 9.

15. An amorphous nanocrystalline ribbon, wherein the amorphous nanocrystalline ribbon is composed of the amorphous nanocrystalline soft magnetic material according to claim 1.

16. An amorphous nanocrystalline magnetic sheet, wherein the amorphous nanocrystalline magnetic sheet is prepared from the amorphous nanocrystalline soft magnetic material according to claim 1.

* * * * *